M. A. KENDALL.
CARRIER FOR BELT CONVEYERS.
APPLICATION FILED NOV. 28, 1917.
1,284,364.
Patented Nov. 12, 1918.
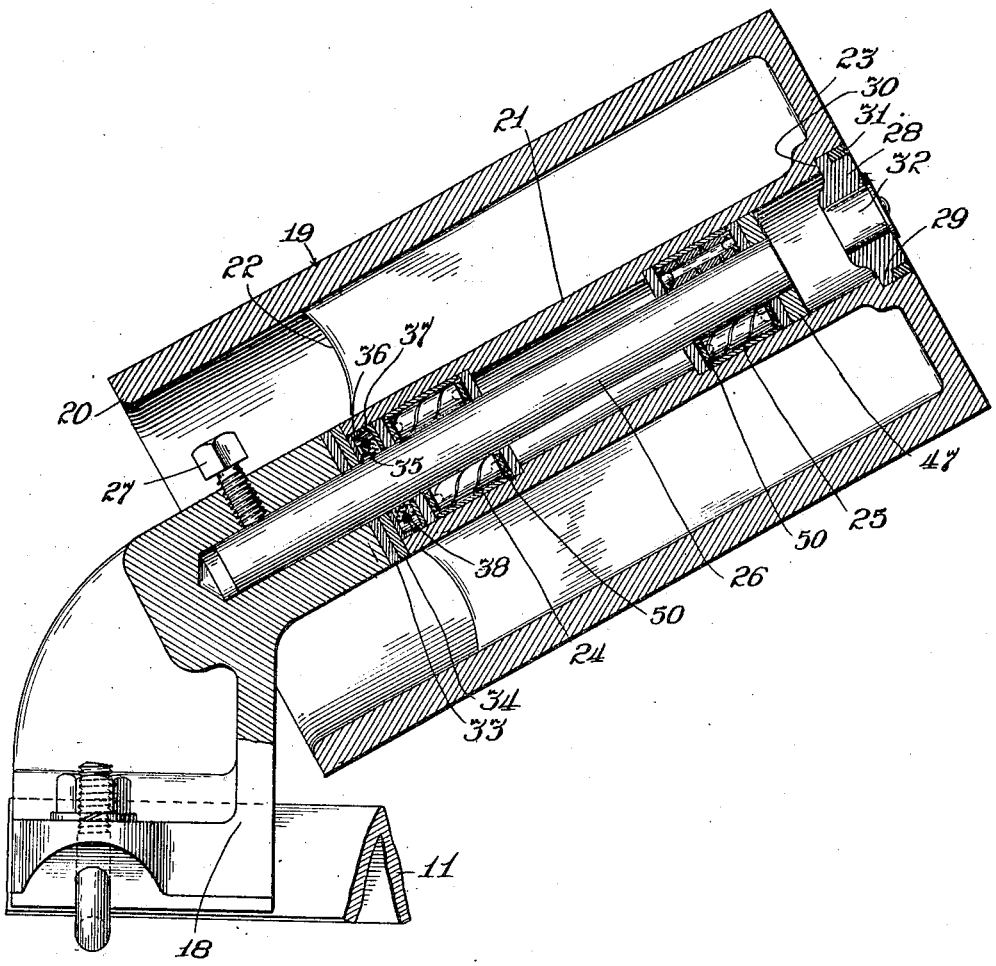
Inventor
Myron A. Kendall
By Gillson & Gillson
Attorneys.

UNITED STATES PATENT OFFICE.

MYRON A. KENDALL, OF AURORA, ILLINOIS, ASSIGNOR TO STEPHENS-ADAMSON MANUFACTURING COMPANY, OF AURORA, ILLINOIS, A CORPORATION OF ILLINOIS.

CARRIER FOR BELT CONVEYERS.

1,284,364.     Specification of Letters Patent.     Patented Nov. 12, 1918.

Application filed November 28, 1917. Serial No. 204,405.

*To all whom it may concern:*

Be it known that I, MYRON A. KENDALL, a citizen of the United States, and resident of Aurora, county of Kane, and State of Illinois, have invented certain new and useful Improvements in Carriers for Belt Conveyers, of which the following is a specification, and which are illustrated in the accompanying drawings, forming a part thereof.

The invention relates to belt conveyers and contemplates an improved carrier for the belt. When belt conveyers are employed for rapidly transporting large amounts of heavy material, the shafts and pulleys which carry the belt may be required to support a substantial load while rotating at a high rate of speed in the presence of quantities of dust or finely divided gritty substances. One of the principal objects of the invention is therefore to supply a belt carrier with bearings having great strength but provided with means for reducing friction and wear and at the same time excluding dust and dirt and restricting the escape of lubricant.

One embodiment of the invention is illustrated in the accompanying drawing, which is a detail vertical transverse sectional view of a carrier for belt conveyers, some parts being shown in elevation.

One of the troughing rollers of a belt conveyer is represented at 19. As usual this troughing roller is mounted upon an inclined bracket generally designated 18. The bracket 18 may in turn be mounted upon a transverse frame member 11.

Each of the troughing rollers as 19 preferably comprises an outer shell 20, a central hub 21, and an end plate 23 which connects the hub and shell at one end. As shown, the hub 21 is of less length than the shell 20 and is also connected therewith by a plurality of radial webs 22 which extend throughout the length of the hub. Within the hub 21 are arranged two sets of roller bearings 24, 25, adapted to roll upon a stationary central spindle 26. The rollers of these bearings may be of any well known construction. Those shown are of tubular form and each comprises a metallic strip or ribbon rolled into a spiral coil. Each bearing 24, 25 comprises a plurality of such rollers assembled within a cage 50 in a well known manner. The spindle 26 is supported at its lower end only. For this purpose it is removably secured to the corresponding bracket 18, as by a set screw 27.

As the bore of the hub 21 of each troughing roller 19 is preferably of reduced diameter between the two roller bearings 24, 25, the introduction of the roller bearings from opposite ends of the hub is required. The end plate 23 of the roller is accordingly apertured in line with the bore of the hub. When the roller bearings 24, 25 and the spindle 26 have been assembled within the roller, the outer end of the hub is preferably tightly closed by a plug, as 28. As shown, the plug 28 is formed with a peripheral flange 29 adapted to rest against an annular shoulder 30 in the end of the hub. Above the flange 29 is an annular space which may be filled by casting therein a ring 31 of soft metal, thereby forming a dust tight closure. Should removal of the plug 28 be required at any time it may be forcibly withdrawn, but it may also be again tightly held in place by swaging the ring 31. Centrally arranged in the plug 28 is an opening through which lubricant may be introduced, the said opening being normally closed by a removable cap 32.

The downward thrust of each troughing roller 19 on its support is preferably received by hard washers 33, 34, two of which are shown. These washers are applied to the spindle 26 between the upper end of the corresponding bracket 18 and the lower end of the hub 21. Upward displacement of the roller 19 on the spindle 26 is prevented by fitting a ring 47 upon the upper end of the spindle over the adjacent roller bearing 25. Escape of lubricant from the lower end of the hub 21 is substantially prevented by applying a felt washer 35 to the spindle 26 immediately below the lower roller bearing, as 24. This felt washer is rendered more effective by mounting it between a pair of metallic flanged rings 36, 37, and by surrounding it with an elastic split ring 38. The metallic rings 36, 37, support the felt washer 35 against lateral distortion and the elastic split ring 38 serves to compress the felt washer upon the spindle 26. A construction is thereby provided which permits of the troughing rollers 19 being operated through long periods without attention, even though these rollers may be rotated at a high rate of speed while supporting a heavy load.

I claim as my invention:

In a belt carrier, in combination, a supporting bracket having an upwardly facing inclined socket, an inclined spindle having its lower end removably held in the said socket, a pulley turning on the spindle with the hub of the pulley extending beyond the upper end of the spindle and the interior of the pulley hub formed with outwardly facing annular shoulders adjacent its opposite ends but with the upper one of the said shoulders below the upper end of the spindle, a packing fitting the lower end of the pulley hub and surrounding the spindle, a thrust plate fixed upon the upper end of the spindle, antifriction rollers turning upon the spindle within the pulley hub between the lower shoulder and the said packing and between the upper shoulder and the said thrust plate, and a plug removably held in the outer end of the pulley hub.

MYRON A. KENDALL.

Copies of this patent may be obtained for five cents each, by addressing the "Commissioner of Patents, Washington, D. C."